No. 707,102. Patented Aug. 19, 1902.
W. GRAHAM.
NUT LOCK.
(Application filed Oct. 29, 1901.)
(No Model.)

Witnesses
C. C. Hunt
J. Abelson

Inventor
William Graham
By H. B. Willson & Co.
Attorneys

UNITED STATES PATENT OFFICE.

WILLIAM GRAHAM, OF DEKOVEN, KENTUCKY.

NUT-LOCK.

SPECIFICATION forming part of Letters Patent No. 707,102, dated August 19, 1902.

Application filed October 29, 1901. Serial No. 80,396. (No model.)

*To all whom it may concern:*

Be it known that I, WILLIAM GRAHAM, a citizen of the United States, residing at Dekoven, in the county of Union and State of Kentucky, have invented certain new and useful Improvements in Nut-Locks; and I do declare the following to be a full, clear, and exact description of the invention, such as will enable others skilled in the art to which it appertains to make and use the same.

This invention relates to nut-locks.

The object of the invention is to provide simple means for connecting a nut to a bolt whereby one will be positively locked to the other against accidental separation.

With this object in view the invention consists in certain novel features and details of construction, combination, and arrangement of parts, as will be hereinafter more fully described, defined in the appended claims, and illustrated in the accompanying drawings, in which—

Figure 1:
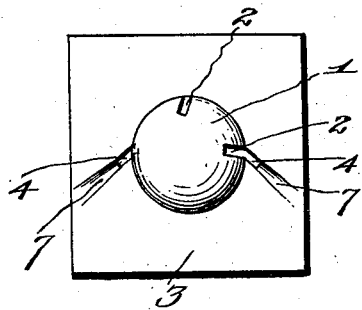
Figure 2:
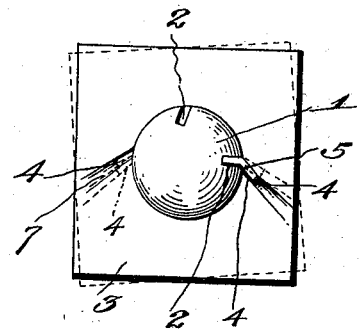
Figure 3:
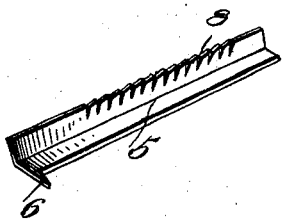
Figure 4:

Figure 1 is an end view of a bolt and nut, the nut being screwed upon the bolt, with one of the grooves of the bolt registering with one of the grooves of the nut for the reception of a key. Fig. 2 is a similar view with the key inserted and the nut being shown in dotted lines as turned slightly backward to cause the key to bind the parts against further backward or unscrewing movement. Fig. 3 is a detail perspective view of the key. Fig. 4 is an end view of the same.

In the drawings, 1 denotes a bolt provided with one or more longitudinal grooves 2, lying in a plane eccentric to the axis of the bolt. 3 denotes a nut threaded to receive said bolt and provided with one or more grooves 4, lying in a plane eccentric to the axis of the nut. The grooves of the nut are arranged at different angles to the grooves of the bolt and sloping in the direction in which the nut turns when being screwed home, so that when the nut is screwed upon the bolt and one groove of the nut made to register with one of the grooves of the bolt an angular groove will be produced, and into this angular groove is inserted a key 5, which is likewise angular in cross-section and is provided with a head 6, which fits into a recess 7, formed in the top of the nut. It will therefore be seen that the insertion of the key into the alined grooves may be easily effected after the nut has been screwed home. Now by giving the nut a slight retrograde movement or turn the action is to flex or straighten out the key, and in doing this its edges are caused to bite or tightly bind against the nut and the bolt. To increase the holding effect of the key, it may be provided on one edge with teeth 8.

It may be well to observe here that the idea is to produce an angular longitudinal groove by establishing communication or registration between the groove of the bolt and the groove of the nut, and while I have shown the preferred way of effecting this it is evident that the nut may be provided with radial grooves and the bolt with eccentric grooves, or vice versa, or, as shown, each may be provided with eccentric grooves so long as the grooves are cut on different angles, the effect being that only one groove of the bolt is made to register with a groove of the nut. Then an angular longitudinal groove is produced, into which is inserted a key which in cross-section preferably corresponds to the angle of the registering grooves of the bolt and nut.

From the foregoing description, taken in connection with the accompanying drawings, it is thought that the construction, mode of operation, and advantages of the invention will be readily apparent without requiring an extended explanation.

Various changes in the form, proportion, and the minor details of construction may be resorted to without departing from the principle or sacrificing any of the advantages of this invention, and I therefore reserve to myself the right to make such changes as clearly fall within the scope thereof.

I claim—

1. A bolt and a nut, the one provided with a longitudinal groove and the other with a longitudinal groove arranged in a plane eccentric to the axis of the bolt and sloping in the direction in which the nut turns when being screwed home; in combination with a key adapted to be inserted into said grooves when they register, said key being made angular in cross-section to correspond to the angularity of the registering grooves and adapted, by a retrograde movement or turn of the nut, to be forced firmly into binding contact, substantially as set forth.

2. The combination with a bolt provided with a longitudinal groove arranged in a plane eccentric to the axis of the bolt, of a nut provided with a longitudinal groove arranged in a plane eccentric to the axis of the nut and at an angle to the first-named groove and sloping in the direction in which the nut turns when being screwed home, whereby when the groove of the nut is made to register with the groove of the bolt, the outline of the groove will be angular, and a key angular in cross-section to correspond with the angularity of the registering grooves, substantially as set forth.

In testimony whereof I have hereunto set my hand in presence of two subscribing witnesses.

WILLIAM GRAHAM.

Witnesses:
　WILLIE McGUIRE,
　ENERT LITTELL.